United States Patent
Yasunaga

(10) Patent No.: US 11,059,247 B2
(45) Date of Patent: Jul. 13, 2021

(54) VENT PLUG, TIRE CURE MOLD, AND METHOD OF MANUFACTURING TIRE

(71) Applicant: Toyo Tire Corporation, Itami (JP)

(72) Inventor: Toshikazu Yasunaga, Itami (JP)

(73) Assignee: TOYO TIRE CORPORATION, Itami (JP)

( * ) Notice: Subject to any disclaimer, the term of this patent is extended or adjusted under 35 U.S.C. 154(b) by 65 days.

(21) Appl. No.: 16/529,156

(22) Filed: Aug. 1, 2019

(65) Prior Publication Data

US 2020/0130304 A1 Apr. 30, 2020

(30) Foreign Application Priority Data

Oct. 25, 2018 (JP) .............................. JP2018-200782

(51) Int. Cl.
*B29D 30/06* (2006.01)
*B29C 33/10* (2006.01)

(52) U.S. Cl.
CPC .......... *B29D 30/0606* (2013.01); *B29C 33/10* (2013.01); *B29D 2030/0617* (2013.01)

(58) Field of Classification Search
CPC ........ B29D 30/0606; B29D 2030/0617; B29C 33/10
See application file for complete search history.

(56) References Cited

U.S. PATENT DOCUMENTS

| | | | | |
|---|---|---|---|---|
| 2,865,052 A | * | 12/1958 | Wilcox ................... | B29C 45/34 249/141 |
| 4,492,554 A | * | 1/1985 | Carter ..................... | B29C 33/10 425/28.1 |
| 8,287,260 B2 | * | 10/2012 | Penkkimaki ............ | B29C 33/10 425/28.1 |
| 2013/0001836 A1 | | 1/2013 | Penkkimaki | |

FOREIGN PATENT DOCUMENTS

| | | |
|---|---|---|
| CN | 201696574 U | 1/2011 |
| CN | 105946149 A | 9/2016 |
| JP | 2017-202625 A | 11/2017 |

OTHER PUBLICATIONS

Office Action dated May 10, 2021, issued in counterpart CN application No. 201910499800.5 with English translation. (22 pages).

* cited by examiner

*Primary Examiner* — James P Mackey
(74) *Attorney, Agent, or Firm* — Westerman, Hattori, Daniels & Adrian, LLP

(57) ABSTRACT

A vent plug is mounted in a vent hole open in a molding face of a tire cure mold. The vent plug has a cylindrical housing having a vent path in itself, a stem that is inserted into the housing and serves as a valve element for opening and closing the vent path, and a coil-shaped spring that biases the stem toward a cavity so as to open the vent path. The stem includes a columnar trunk portion and a head portion that comes in contact with a valve seat at an opening portion of the housing to thereby close the vent path. The stem turns as the stem moves along an axial direction.

9 Claims, 10 Drawing Sheets

[Fig. 1]
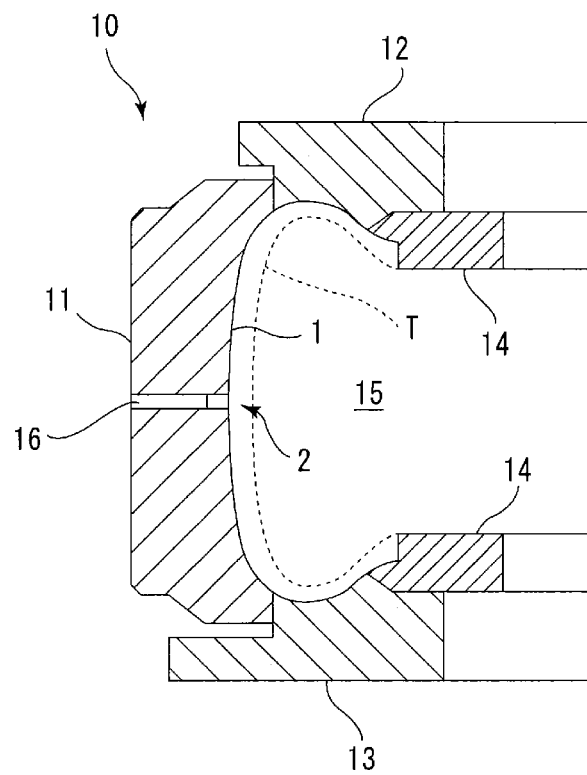

[Fig. 2]
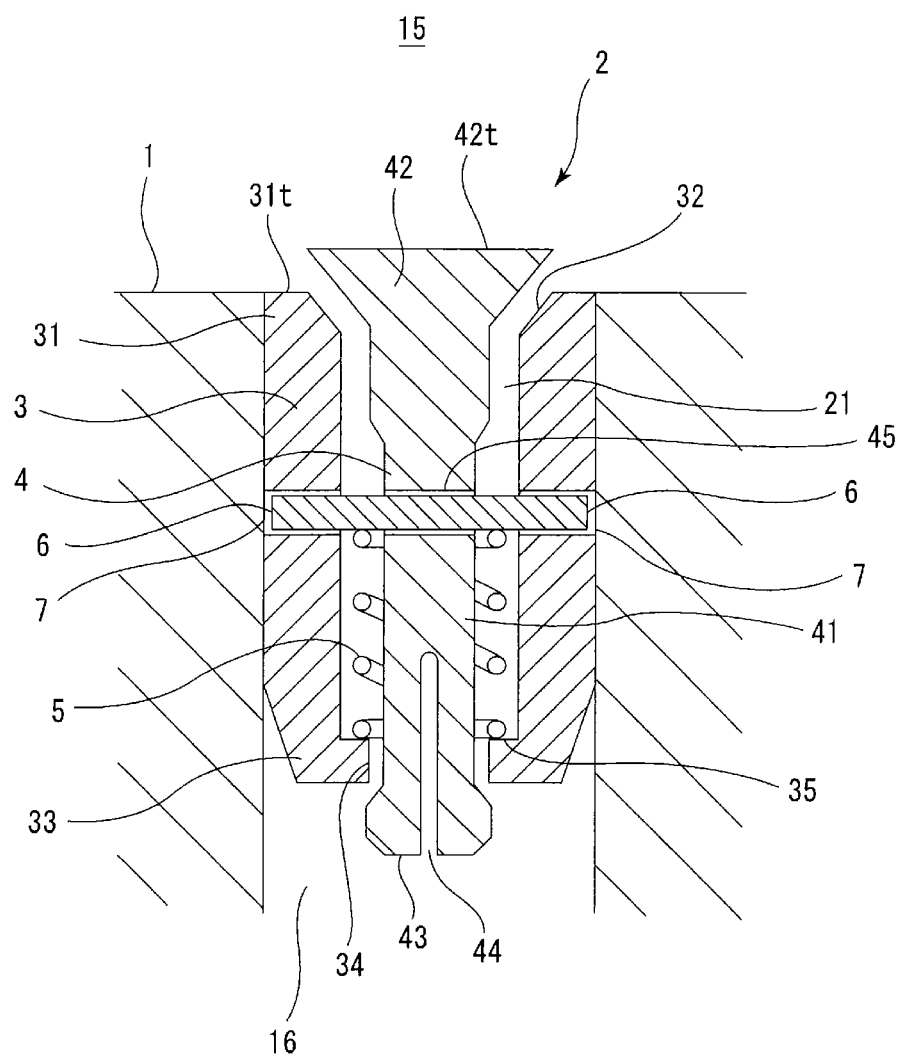

[Fig. 3]
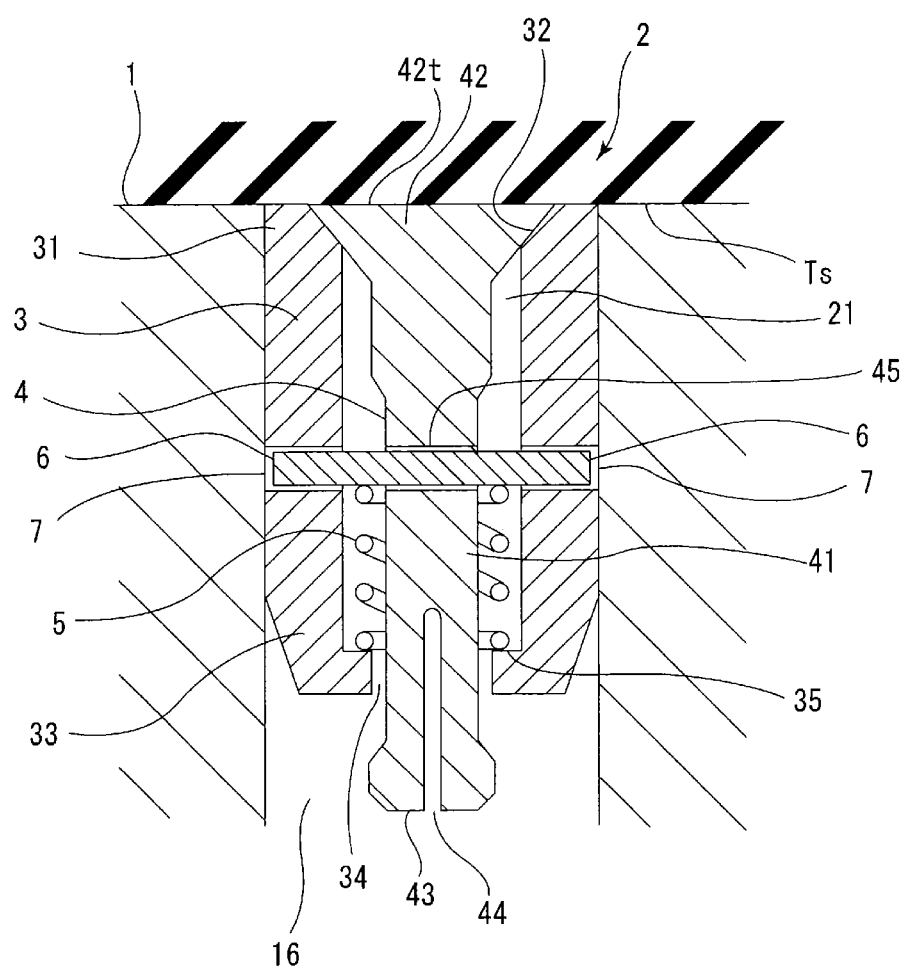

[Fig. 4]
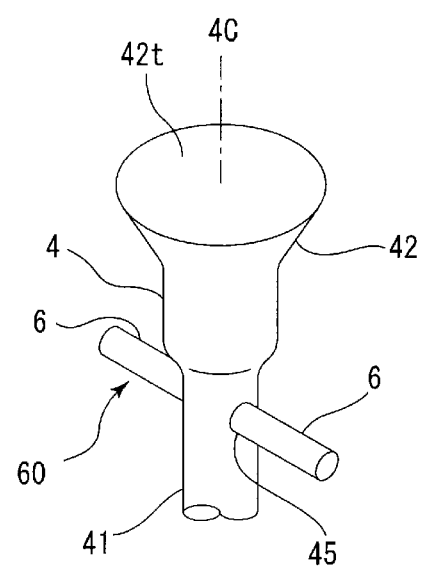

[Fig. 5A]
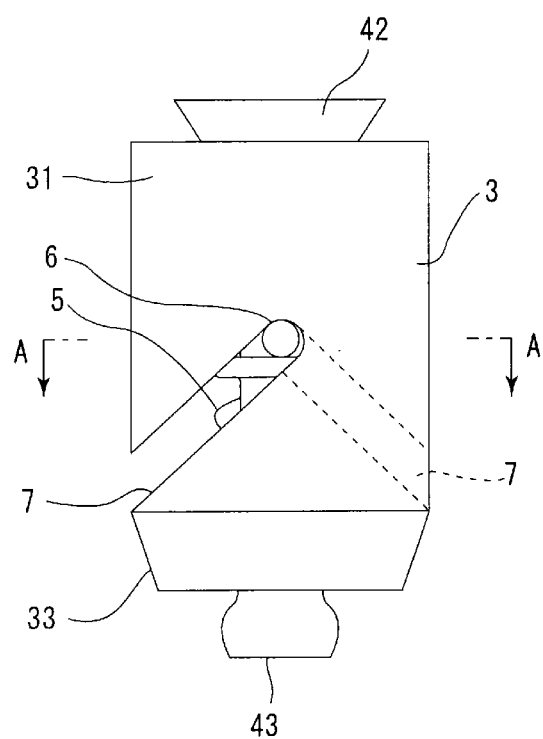
[Fig. 5B]
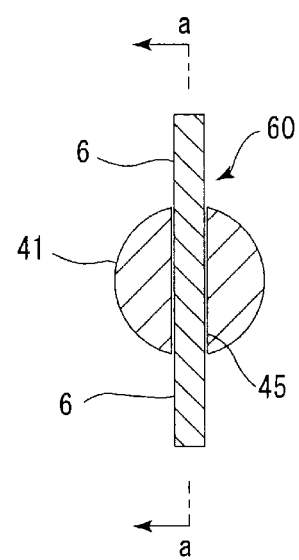

[Fig. 6A]
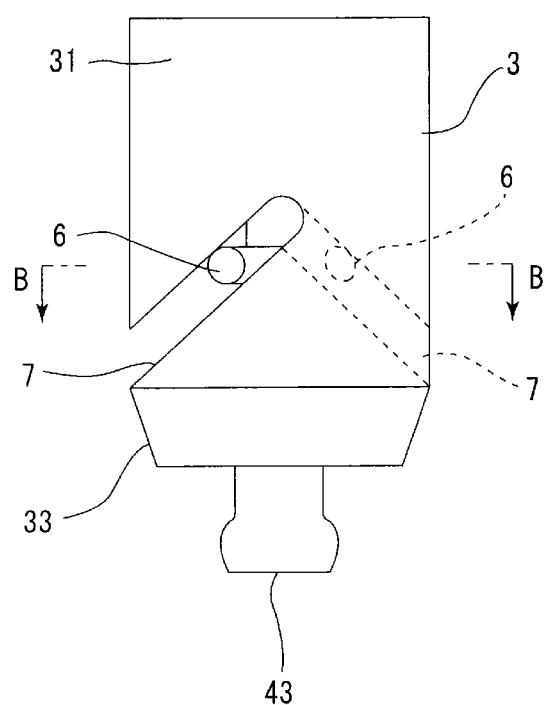
[Fig. 6B]
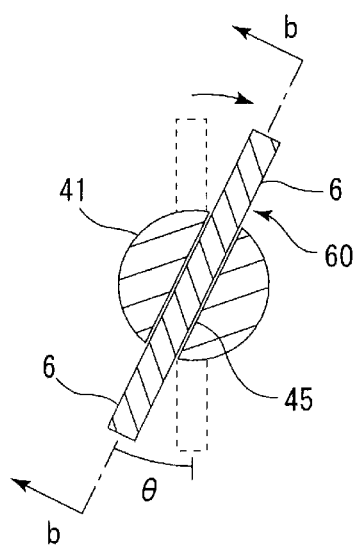

[Fig. 7]
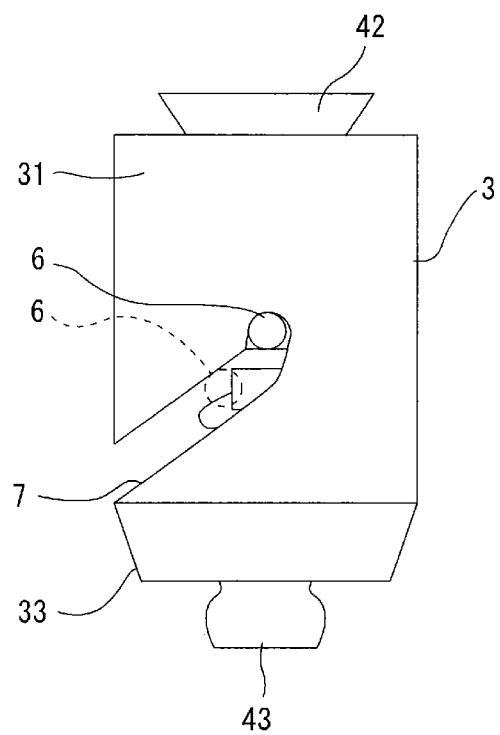

[Fig. 8]
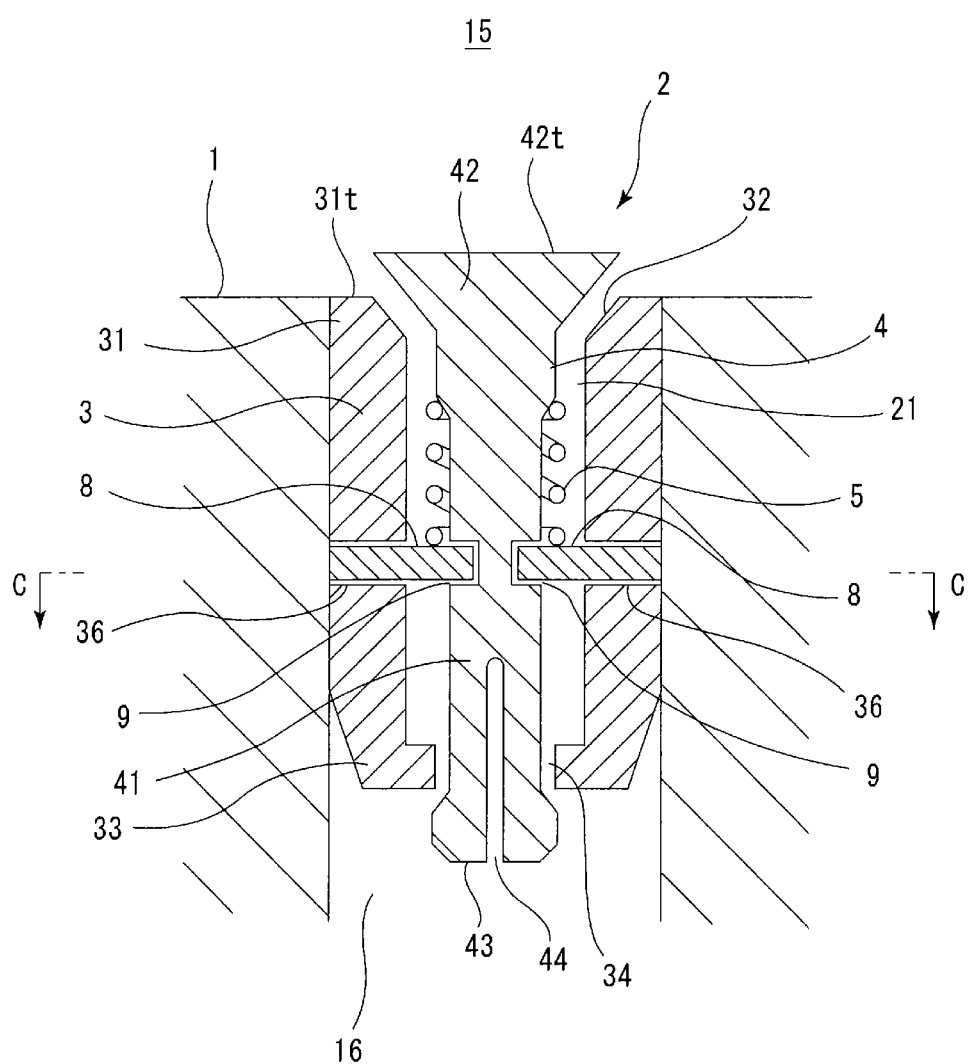

[Fig. 9]
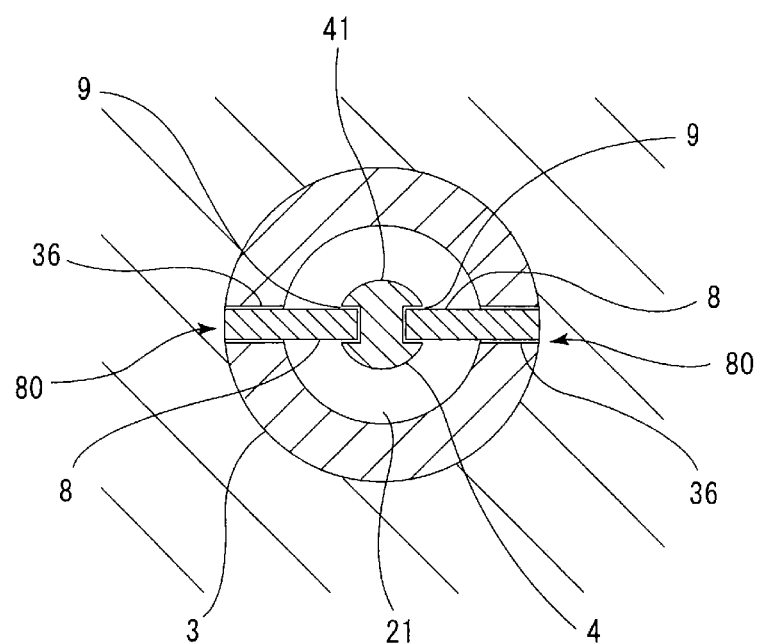

[Fig. 10]
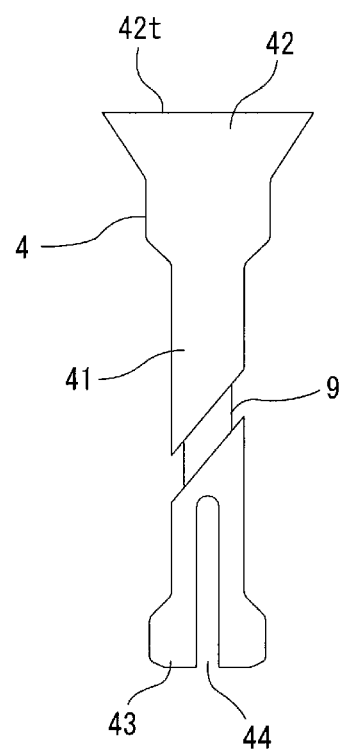

VENT PLUG, TIRE CURE MOLD, AND METHOD OF MANUFACTURING TIRE

BACKGROUND OF THE INVENTION

Field of the Invention

The present invention relates to a vent plug mounted in a vent hole in a molding face that comes in contact with an outer surface of a tire, a tire cure mold including the vent plug, and a method of manufacturing the tire by use of the tire cure mold.

Description of the Related Art

Conventionally, the tire cure mold has a large number of vent holes in a molding face for molding an outer surface of a tire. The vent holes lead to an inside and an outside of the mold and exhaust air between the outer surface of the tire and the molding face during cure to thereby prevent formation of a dent called "bear". During the cure, rubber on the outer surface of the tire flows into the vent holes and, as a result, forms a large number of rubber protrusions called "spews".

On the other hand, there is a known method of preventing formation of spews by mounting vent plugs in vent holes. A vent plug disclosed in Patent Document 1 is opened by biasing of a stem, inserted into a cylindrical housing, by a spring and is closed by pushing down of the stem by an outer surface of a tire. The vent plug of this type has a tapered valve seat formed at an opening portion of the housing and is closed when a head portion of the stem is seated on the valve seat.

As the tire cure is carried out repeatedly, rubber residue may adhere in a clearance between the valve seat of the housing at the opening portion and the head portion of the stem. If the rubber residue accumulates in the clearance at the opening portion, a stroke of the stem from the open state to the closed state is shortened and the vent plug comes into the closed state earlier than intended, which may result in insufficient exhaust of the air. In addition, adhesion of the rubber residue makes separation of the head portion of the stem from the valve seat difficult, which prevents a return of the vent plug from the closed state to the open state.

In Patent Document 1, a cleaning method and a cleaning device used to remove the rubber residue accumulated in the clearance at the opening portion are proposed. However, the cleaning method and the cleaning device are cleaning techniques used for maintenance work after the tire cure has been carried out repeatedly and the method and the device do not suppress the accumulation of the rubber residue during the cure step. Therefore, when the rubber residue starts to accumulate in the clearance at the opening portion while the tire cure is repeated, it is impossible to suppress the accumulation and the inconvenience described above is caused unavoidably.

PRIOR ART DOCUMENT

Patent Document

Patent Document 1: JP-A-2017-202625

SUMMARY OF THE INVENTION

The present invention has been made with the above-described circumstances in view and an objective of the invention is to provide a vent plug capable of suppressing accumulation of rubber residue in a clearance at an opening portion, a tire cure mold, and a method of manufacturing a tire.

The object can be achieved by the following present invention. A vent plug in accordance with the present invention is mounted in a vent hole open in a molding face of a tire cure mold. The vent plug has a cylindrical housing having a vent path in itself; a stem that is inserted into the housing and serves as a valve element for opening and closing the vent path; and a coil-shaped spring that biases the stem toward a cavity so as to open the vent path. The stem includes a columnar trunk portion and a head portion that comes in contact with a valve seat at an opening portion of the housing to thereby close the vent path and the stem turns as the stem moves along an axial direction. With this structure, the stem turns as the vent plug opens and closes and the head portion of the stem rubs the valve seat. As a result, it is possible to suppress accumulation of rubber residue in a clearance between the valve seat of the housing and the head portion of the stem, i.e., the clearance at the opening portion.

It is preferable that one of the trunk portion and the housing is provided with a guide protrusion protruding in a diametrical direction and the other is provided with a guide groove in which the guide protrusion is fitted and which extends while inclined with respect to the axial direction and the stem turns due to guiding effects of the guide protrusion and the guide groove when the stem moves along the axial direction. With this structure, it is possible to turn the stem with the guiding effects of the guide protrusion and the guide groove.

It is preferable that a position of a closer end of the spring to the cavity is regulated by the guide protrusion. With this structure, the spring is disposed away from the opening portion and, as a result, it is possible to prevent tangling of rubber, flowing into the housing, with the spring, i.e., occurrence of what is called a rubber nip to thereby avoid a malfunction of the vent plug.

It is preferable that the guide protrusion is formed by a pin that is a separate member from the housing and the stem and the pin is capable of being mounted to the stem or the housing after the stem is inserted into the housing. In this way, it is easy to assemble the vent plug having the above-described guide protrusion.

A tire cure mold in accordance with the present invention has the molding face that comes in contact with an outer surface of a tire set in the cavity and the above-described vent plug mounted in the vent hole open in the molding face. With this structure, it is possible to turn the stem as described above as the vent plug opens and closes to thereby suppress the accumulation of the rubber residue in the clearance at the opening portion of the vent plug.

A method of manufacturing a tire in accordance with the present invention has a step of performing cure by setting an uncured tire in the cavity of a tire cure mold including the above-described vent plug and heating and pressurizing the uncured tire. With this method, it is possible to turn the stem as described above as the vent plug opens and closes to thereby suppress the accumulation of the rubber residue in the clearance at the opening portion of the vent plug.

BRIEF DESCRIPTION OF THE DRAWINGS

FIG. 1 is a vertical sectional view schematically showing an example of a tire cure mold having a vent plug according to the present invention;

FIG. 2 is a sectional view showing the vent plug mounted in a vent hole and in an open state;

FIG. 3 is a sectional view showing the vent plug mounted in a vent hole and in a closed state;

FIG. 4 is a perspective view of a part of a trunk portion and a head portion of a stem;

FIG. 5A is a front view of the vent plug in the open state;

FIG. 5B is a cross-sectional view of the stem in the open state;

FIG. 6A is a front view of the vent plug in the closed state;

FIG. 6B is a cross-sectional view of the stem in the closed state;

FIG. 7 is a front view of a vent plug in another embodiment;

FIG. 8 is a sectional view of a vent plug in another embodiment;

FIG. 9 is a sectional view taken in a direction of arrows C-C in FIG. 8; and

FIG. 10 is a front view of a stem shown in FIG. 8.

DETAILED DESCRIPTION OF THE PREFERRED EMBODIMENTS

An embodiment of the present invention will be explained with reference to the drawings.

FIG. 1 shows a section of a tire cure mold 10 (hereinafter merely referred to as "mold 10" in some cases) along a tire meridian. The mold 10 is in a closed state. A tire T is set with a tire width direction oriented in a vertical direction. In FIG. 1, a left side corresponds to an outer side in a tire diametrical direction and a right side corresponds to an inner side in the tire diametrical direction. FIG. 2 is an enlarged view of a relevant part in FIG. 1, wherein an upper side corresponds to the inner side in the tire diametrical direction and a lower side corresponds to the outer side in the tire diametrical direction.

The mold 10 has a molding face 1 that comes in contact with an outer surface of the tire T set in a cavity 15. In the molding face 1, vent holes 16 communicating with an inside (the cavity 15) and an outside of the mold 10 are formed. In cure, air between the tire T and the molding face 1 is exhausted through the vent holes 16. As shown in the enlarged view in FIG. 2, a vent plug 2 is mounted in each of the vent holes 16 open in the molding face 1.

An aluminum material is exemplified as a raw material of the molding face 1. The aluminum material is a concept including an aluminum alloy in addition to a pure aluminum raw material, for example, there can be listed up Al—Cu, Al—Mg, Al—Mg—Si, Al—Zn—Mg, Al—Mn and Al—Si. A housing 3 and a stem 4 (described later) forming the vent plug 2 are preferably made of steel represented by stainless steel and S45C and the housing 3 and the stem 4 may be made of the same kind or different kinds of metal.

The mold 10 includes a tread mold portion 11 for molding a tread portion of the tire, side mold portions 12, 13 for molding sidewall portions of the tire, and bead rings 14, 14 in which bead portions of the tire are fitted. The molding face 1 includes an inner face of the tread mold portion 11 and inner faces of the side mold portions 12, 13. Protruding bone portions (not shown) for forming grooves in a tread face of the tire are provided to the inner face of the tread mold portion 11. Although only one of the vent holes 16 open in the inner face of the tread mold portion 11 is shown in FIG. 1, there are actually the large number of vent holes open in the inner faces of the tread mold portion 11 and the side mold portions 12, 13.

As shown in FIG. 2, the vent plug 2 includes the cylindrical housing 3 having a vent path 21 in itself, the stem 4 that is inserted into the housing 3 and serves as a valve element for opening and closing the vent path 21, and a coil-shaped spring 5 that biases the stem 4 toward the cavity 15 so as to open the vent path 21. The housing 3 is fixed to the molding face 1. More specifically, the housing 3 is press-fitted into the vent hole 16 by interference fitting. A tapered valve seat 32 is formed at an opening portion 31 of the housing 3. In a farther end 33 of the housing 3 from the cavity 15, a through hole 34 and a support portion 35 having an inner flange shape are formed.

The stem 4 has a columnar trunk portion 41 and a head portion 42 integrally connected to the trunk portion 41. The trunk portion 41 is formed in a circular columnar shape extending in an axial direction as a whole. The trunk portion 41 is inserted through the spring 5. The head portion 42 comes in contact with the valve seat 32 at the opening portion 31 of the housing 3 to thereby close the vent path 21. At a farther end of the trunk portion 41 from the cavity 15, a stopper 43 having a larger diameter than the through hole 34 is formed. Detachment of the stem 4 from the housing 3 is prevented by the stopper 43. The stopper 43 can pass through the through hole 34 when the stopper 43 is resiliently deformed in such a manner as to close a slit 44.

In FIG. 2, the vent path 21 is open and the vent plug 2 is in an open state. In the open state, the head portion 42 of the stem 4 pushed up by the spring 5 is separate from the valve seat 32. In the open state of the vent plug 2, the air in the cavity 15 is exhausted to the outside of the mold 10 through the vent path 21 as the outer surface of the tire approaches the molding face 1. The vent path 21 is formed to extend from a clearance at the opening portion of the vent plug 2 (i.e., a clearance between the valve seat 32 and the head portion 42) through a space around the trunk portion 41 and the through hole 34.

In FIG. 3, the vent path 21 is closed and the vent plug 2 is in a closed state. In the closed state, the head portion 42 of the stem 4 pushed down by the outer surface Ts of the tire becomes seated on the valve seat 32. A side face of the head portion 42 is formed in a tapered shape conforming to the valve seat 32. Although a top face 42t of the head portion 42 facing the cavity 15 is flush with a top face 31t of the housing in the closed state in the embodiment, the top face 42t does not necessarily have to be formed in this manner. When the outer surface Ts of the tire separates from the molding face 1, the stem 4 is pushed up by the spring 5 and the vent plug 2 comes into the open state shown in FIG. 2.

As described above, the stem 4 moves along an axial direction as the vent plug 2 opens and closes. Moreover, the vent plug 2 is formed so that the stem 4 turns as the stem 4 moves along the axial direction. In this way, the head portion 42 rubs the valve seat 32 when the head portion 42 is about to become seated on the valve seat 32 and when the head portion 42 is about to separate from the valve seat 32, which suppresses accumulation of rubber residue in the clearance at the opening portion of the vent plug 2. The head portion 42 of the stem 4 rubs the valve seat 32 every time the vent plug 2 opens/closes to thereby slow a process of accumulation of the rubber residue.

In demolding the tire after the cure, the stem may be pulled up due to close contact of the outer surface of the tire with the top face of the stem and, as a result, the stem may be detached from the housing, which is called "stem detachment". On the other hand, in the vent plug 2 in the embodiment, the stem 4 turns as the stem 4 moves along the axial direction and therefore the top face 42*t* easily peels off from the outer surface Ts, which prevents the stem detachment.

FIG. 4 is a perspective view of a part of the trunk portion 41 and the head portion 42 of the stem 4. FIG. 5A is a front view of the vent plug 2 in the open state and FIG. 5B is a cross-sectional view of the stem 4 taken in a direction of arrows A-A in FIG. 5A. FIG. 6A is a front view of the vent plug 2 in the closed state and FIG. 6B is a cross-sectional view of the stem 4 taken in a direction of arrows B-B in FIG. 6A. The stem 4 of the vent plug 2 shown in FIG. 2 corresponds to a sectional view taken in a direction of arrows a-a in FIG. 5B. The stem 4 of the vent plug 2 shown in FIG. 3 corresponds to a sectional view taken in a direction of arrows b-b in FIG. 6B. Therefore, FIGS. 2 and 3 are the sectional views taken along lines at different angles from each other.

As shown in FIGS. 4 to 6, guide protrusions 6 protruding in a diametrical direction of the vent plug 2 are provided to the trunk portion 41 of the stem 4 in the embodiment. Guide grooves 7 in which the guide protrusions 6 are fitted and which extend while inclining with respect to the axial direction of the vent plug 2 are formed in the housing 3. The vent plug 2 is formed so that the stem 4 turns due to guiding effects of the guide protrusions 6 and the guide grooves 7 when the stem 4 moves along the axial direction. Although the guide grooves 7 are formed in slit shapes passing through the housing 3 in the diametrical direction, the guide grooves 7 do not necessarily have to be formed in the slit shapes, as long as the guide protrusions 6 can be fitted into the guide grooves 7.

The stem 4 turns about an axis 4C as the vent plug 2 opens and closes. A turning angle θ (see FIG. 6B) of the stem 4 is not limited to a specific angle, but preferably 15° or larger, more preferably 30° or larger, and yet more preferably 45° or larger. The turning angle θ of the stem 4 can be set suitably by adjusting a stroke of movement of the stem 4 along the axial direction and inclination angles of the guide grooves 7, for example.

The spring 5 is disposed between the guide protrusions 6 and the support portion 35 and biases the stem 4 toward the cavity 15. A position of a closer end of the spring 5 to the cavity 15 is regulated by the guide protrusions 6. In a cure step, the uncured rubber flowing into the housing may get tangled in the spring to cause a rubber nip, which may result in a malfunction of the vent plug. According to the embodiment, however, it is possible to keep the spring 5 away from the opening portion 31 by regulating the position of the end of the spring 5 with the guide protrusions 6 and, as a result, it is possible to prevent occurrence of the rubber nip to thereby avoid the malfunction of the vent plug 2.

The guide protrusions 6 are provided in a pair at positions facing each other across the axis 4C of the stem 4. The guide grooves 7 are provided in a pair at positions corresponding to the guide protrusions 6. In other words, the paired guide grooves 7, 7 corresponding to the paired guide protrusions 6, 6 are provided to the housing 3. Therefore, the guiding effects of the guide protrusions 6 and the guide grooves 7 are exerted at the two positions facing each other across the axis 4C of the stem 4. As a result, a pose of the stem 4 becomes stable, which is advantageous in turning the stem 4 while moving the stem 4 in the axial direction.

The guide protrusions 6 are formed by a pin 60 that is a separate member from the housing 3 and the stem 4. The pin 60 is inserted through an insertion hole 45 formed in the stem 4 and portions of the pin 60 protruding from the stem 4 form the guide protrusions 6. The pin 60 can be mounted to the stem 4 after the stem 4 is inserted into the housing 3. Specifically, the pin 60 can be inserted through the insertion hole 45 through the guide grooves 7 after the stem 4 is inserted into the housing 3 and, as a result, the guide protrusions 6 are fitted into the guide grooves 7. In this way, as compared with a case where guide protrusions 6 are formed integrally with a stem 4, it is easier to assemble the vent plug 2.

The method of manufacturing the tire by using the mold 10 includes a step of performing cure (cure step) by setting an uncured tire in the cavity 15 of the mold 10 and heating and pressurizing the uncured tire. The tire is expanded and deformed by inflation of a rubber bag called bladder and the outer surface of the tire comes to push the molding face 1. In this process, the air between the tire and the molding face 1 is exhausted outside through the vent path 21 in each of the vent plugs 2. At this time, it is possible to draw the air in a space in the vent hole 16 by using a suction device to thereby enhance exhausting performance. In a process of repeatedly performing the tire cure by using the mold 10, the stem 4 turns as the vent plug 2 opens and closes to thereby suppress the accumulation of the rubber residue in the clearance at the opening portion of the vent plug 2.

In the embodiment, the vent plug 2 described above is mounted in the vent hole 16 open in an inner face of the tread mold portion 11 as the molding face 1. Alternatively or additionally, it is also possible to mount the vent plug 2 in each of the vent holes open in the inner face(s) of the side mold portion 12 (and/or the side mold portion 13).

Although a mold structure including the tread mold portion 11 and the paired side mold portions 12, 13 is shown as an example in the embodiment, the mold does not necessarily have to have this structure and a mold structure split into upper and lower two portions at a center of a tread mold portion may be employed, for example.

FIGS. 7 to 10 respectively show variations of the vent plug 2. Because the variations have the same structures and effects as those of the above-described embodiment except structures described below, the common structures will not be described and differences will be mainly described. The same structures as those described above will be provided with the same reference signs and will not be described repeatedly.

Although the guide grooves 7 are inclined with certain inclinations in the example shown in the above-described embodiment, the guide grooves 7 do not necessarily have to be inclined in this manner. For example, inclination angles of guide grooves 7 with respect to an axial direction may be varied as shown in FIG. 7. In FIG. 7, a vent plug 2 is in an open state and a position of a guide protrusion 6 in a closed state is shown by a broken line. In this example, the inclination angle of each of the guide grooves 7 with respect to the axial direction is relatively small at a closer end to the opening portion 31 and relatively large at a portion other than the end. With this structure, it is possible to reduce a resistance to initial motion of a stem 4 in closing of the vent plug 2 to thereby help the stem 4 start to turn smoothly.

Although the guide protrusions 6 are provided to the trunk portion 41 of the stem 4 and the guide grooves 7 are provided to the housing 3 in the example shown in the above embodiment, it is possible to reverse the members to which the guide protrusions 6 and the guide grooves 7 are provided. In other words, guide protrusions may be provided to a housing 3 and guide grooves may be provided to a trunk portion 41 of a stem 4. In short, the guide protrusions 6 may be provided to one of the trunk portion 41 of the stem 4 and the housing 3 and the guide grooves 7 may be provided to the other. However, the structure with the guide protrusions provided to the trunk portion 41 of the stem 4 and the guide grooves provided to the housing 3 can be formed by relatively easy working and therefore such a structure is practical.

In an example shown in FIGS. 8 to 10, guide protrusions 8 are provided to a housing 3 and guide grooves 9 are provided to a trunk portion 41. A vent plug 2 is formed so that a stem 4 turns due to guiding effects of the guide protrusions 8 and the guide grooves 9 when the stem 4 moves along an axial direction. A spring 5 is disposed between the guide protrusions 8 and a head portion 42 and biases the stem 4 toward a cavity 15. A position of a farther end of the spring 5 from the cavity 15 is regulated by the guide protrusions 8. The guide protrusions 8 are provided in a pair at positions facing each other across an axis of the stem 4 and the guide grooves 9 are provided in a pair at positions corresponding to the guide protrusions 8.

The guide protrusions 8 are formed by pins 80 that are separate members from the housing 3 and the stem 4. The pins 80 are inserted through insertion holes 36 formed in a side face of the housing 3 and portions of the pins 80 protruding from an inner face of the housing 3 form the guide protrusions 8. The pins 80 can be mounted to the housing 3 after the stem 4 is inserted into the housing 3. Specifically, by inserting the pins 80 through the insertion holes 36 after the stem 4 is inserted into the housing 3, the guide protrusions 8 are fitted into the guide grooves 9. In this way, as compared with a case where guide protrusions 8 are formed integrally with a stem 4, it is easier to assemble the vent plug 2.

The above-described tire cure mold is equivalent to a normal tire cure mold except that the vent plugs mounted in the vent holes are formed as described above. Therefore, any of prior-art known shapes, materials, mechanisms, and the like can be used for the present invention.

The present invention is not limited to the embodiment mentioned above, but can be improved and modified variously within the scope of the present invention.

What is claimed is:

1. A vent plug mounted in a vent hole open in a molding face of a tire cure mold, the vent plug comprising:
    a cylindrical housing having a vent path in itself;
    a stem that is inserted into the housing and serves as a valve element for opening and closing the vent path; and
    a coil-shaped spring that biases the stem toward a cavity so as to open the vent path,
    wherein the stem includes a columnar trunk portion and a head portion that comes in contact with a valve seat at an opening portion of the housing to thereby close the vent path,
    wherein one of the trunk portion and the housing is provided with a guide protrusion protruding in a diametrical direction and the other is provided with a guide groove in which the guide protrusion is fitted and which extends while inclined with respect to the axial direction,
    wherein the stem turns due to guiding effects of the guide protrusion and the guide groove as the stem moves along an axial direction, and
    wherein a position of an end of the spring is defined by the guide protrusion.

2. The vent plug according to claim 1, wherein the guide protrusion is provided to the trunk portion and the guide groove is provided to the housing.

3. The vent plug according to claim 2, wherein the position of the end of the spring defined by the guide protrusion is an end of the spring closest to the cavity.

4. The vent plug according to claim 2, wherein the guide groove is formed in a slit shape passing through the housing in the diametrical direction.

5. The vent plug according to claim 1, wherein
    the guide protrusion includes a pair of guide protrusions provided at positions facing each other across an axis of the stem, and
    the guide groove includes a pair of guide grooves provided at positions corresponding to the pair of guide protrusions.

6. The vent plug according to claim 1, wherein a turning angle of the stem in opening and closing of the vent plug is 15° or larger.

7. A tire cure mold comprising the molding face that comes in contact with an outer surface of a tire set in the cavity and the vent plug according to claim 1 mounted in the vent hole open in the molding face.

8. A method of manufacturing a tire comprising a step of performing cure by setting an uncured tire in the cavity of a tire cure mold including the vent plug according to claim 1 and heating and pressurizing the uncured tire.

9. A vent plug mounted in a vent hole open in a molding face of a tire cure mold, the vent plug comprising:
    a cylindrical housing having a vent path in itself;
    a stem that is inserted into the housing and serves as a valve element for opening and closing the vent path; and
    a coil-shaped spring that biases the stem toward a cavity so as to open the vent path,
    wherein the stem includes a columnar trunk portion and a head portion that comes in contact with a valve seat at an opening portion of the housing to thereby close the vent path and the stem turns as the stem moves along an axial direction, and
    wherein the guide protrusion is formed by a pin that is a separate member from the housing and the stem and the pin is capable of being mounted to the stem or the housing after the stem is inserted into the housing.

* * * * *